United States Patent Office 3,095,268
Patented June 25, 1963

3,095,268
PROCESS FOR THE PREPARATION
OF LEAD AZIDE
Allan Gustav Boström, Stockholm, and Stig Yngve Ek and Lars Anders Malte Lindnér, Sundbyberg, Sweden
No Drawing. Filed July 11, 1955, Ser. No. 521,388
4 Claims. (Cl. 23—101)

The present invention relates to a process for the preparation of lead azide by precipitation at elevated temperature from a solution of a lead salt, e.g. lead nitrate, in excess with an easily soluble azide, e.g. an alkali azide.

The primary object of the invention is to obtain a lead azide which splits off less hydrazoic acid than previously prepared lead azides.

The invention is in the first hand characterized by the fact that the precipitation takes place at a temperature of at least 65° C., preferably, however, between 70° C. and 90° C.

In the process according to the invention a higher precipitation temperature is employed than previously used. The temperature previously used was usually about 50–55° C. For the purpose of rendering the apparatus more simple it is preferred in the employment of the invention to use a precipitation temperature below 100° C., but there is nothing to prevent the use of higher temperatures, but in that case an autoclave apparatus is required.

In the precipitation process according to the invention the amount of lead nitrate should be in greater excess than hitherto used, that is to say the amount of alkali azide should be considerably lower than previously used. It is suitable that the amount of alkali azide relative to the amount of lead nitrate is at the most 1.5:4, calculated as equivalents.

In order to attain an even grain size of the lead azide crystals and make the preparation of the ready product well reproducible also in other respects the addition of the sodium azide or other alkali azide should take place rapidly, for instance, within ten minutes.

Before the addition of the alkali azide it is advantageous, in a manner known per se, first to dissolve in the lead nitrate solution about 4.5 percents by weight of dextrin, calculated on the weight of lead nitrate. Furthermore, a minor quantity of alkali, for instance in the mole rate of 0.1:1 relative to the lead nitrate, should preferably be added drop by drop or in a fine jet before the precipitation with alkali azide. Also this addition should take place at elevated temperature, e.g. the above stated.

*Example*

A volume of 650 cubic centimeters of 6% filtered lead nitrate solution is heated to 70° C. and 1.8 grams of dextrin are added thereto. The solution is vigorously stirred. Then 40 cubic centimeters of 0.5 molar sodium hydroxide solution, heated, for instance, to 70° C. are added drop by drop during about 4 minutes. 225 cubic centimeters of a 2% sodium azide solution heated to 70° C. are then added to the lead nitrate solution drop by drop during about 4 minutes. Lead azide in crystalline form is then precipitated from the lead nitrate solution. The crystalline lead azide precipitate obtained can be filtered directly or after being kept for about ½ hour after stirring. The collected precipitate is washed with water for the removal of lead nitrate and sodium nitrate. The precipitate so washed is then washed with a 0.5 molar lead acetate solution and thereafter directly dried in air to a moist percentage of 1% without washing away adherent lead acetate. The obtained product has the following composition, calculated on the dry weight.

96.5% lead azide
2.0% dextrin
1.0% lead acetate
0.5% impurities

In comparison with previously prepared lead azides of similar type the present product has a better initiating capacity and a better loading capacity (i.e. a smaller angle of repose). The process also renders a more homogeneous product from time to time.

The invention is not limited to the above described performance but may be modified within the scope of the appended claims.

What is claimed is:

1. A method of producing lead azide by reacting a solution of lead nitrate with a solution of alkali metal azide comprising the steps of heating both solutions to a temperature of at least 65° C., adding a quantity of the alkali azide solution to an excess quantity of the lead nitrate solution in a mole proportion of at most 1.5:4, and filtering off the lead azide precipitate obtained from the lead nitrate solution.

2. A method as claimed in claim 1, in which the whole quantity of alkali azide solution calculated on a molar rate of at most 1.5:4 is added successively to the lead nitrate solution during less than 10 minutes.

3. A method as claimed in claim 1, in which dextrine and alkaline hydroxide are added to the solution of lead nitrate before the alkali azide is added for precipitating the lead azide, the dextrine being added first and then the alkali hydroxide.

4. A method as claimed in claim 1, in which the lead azide precipitate is washed with a solution of lead acetate.

References Cited in the file of this patent
FOREIGN PATENTS
160,953    Great Britain _____ Apr. 6, 1921
359,659    Great Britain _____ Sept. 25, 1929

OTHER REFERENCES
Chemical Abstracts, vol. 48, 1954, page 13505i.
Mellor: Comprehensive Treatise on Inorganic and Theoretical Chemistry, vol. 8, page 353.
Gmelin-Kraut: Handbuch der Anorganischen Chemie, 4.2, page 238.